United States Patent [19]

Feehan et al.

[11] 4,007,298

[45] Feb. 8, 1977

[54] POLYETHYLENE COATING FOR FERROUS METALS

[75] Inventors: Chester E. Feehan, Allentown; Ernest F. Wagner, Delanco, both of N.J.

[73] Assignee: United States Pipe and Foundry Company, Birmingham, Ala.

[22] Filed: Apr. 21, 1975

[21] Appl. No.: 570,086

Related U.S. Application Data

[62] Division of Ser. No. 464,658, April 26, 1974, abandoned.

[52] U.S. Cl. .............................. 427/195; 427/185; 427/201; 428/218; 428/462
[51] Int. Cl.² ...................... B05D 3/02; B05D 3/08; B05D 3/10
[58] Field of Search .................. 427/185, 195, 201; 260/897 R; 428/218, 462

[56] References Cited

UNITED STATES PATENTS

| | | | |
|---|---|---|---|
| 2,663,652 | 12/1953 | Railing | 427/195 |
| 2,688,563 | 9/1954 | Kieffer | 427/195 |
| 2,983,704 | 5/1961 | Roedel | 260/897 R |
| 3,348,995 | 10/1967 | Baker et al. | 427/195 X |
| 3,410,709 | 11/1968 | Meyer et al. | 427/185 |

FOREIGN PATENTS OR APPLICATIONS

| | | | |
|---|---|---|---|
| 761,723 | 11/1956 | United Kingdom | 260/897 R |
| 827,363 | 2/1960 | United Kingdom | 260/897 R |
| 860,329 | 2/1961 | United Kingdom | 260/897 R |

*Primary Examiner*—Ronald H. Smith
*Assistant Examiner*—Shrive P. Beck
*Attorney, Agent, or Firm*—James W. Grace

[57] ABSTRACT

This invention provides a coating for ferrous metal surfaces, comprised of a blend of high density and low density polyethylene powder. The coating is completed to the desired thickness in one application of the blended powder on a hot (400° to 550° F) ferrous metal surface. The coating may be cured or quenched after application depending on the amount of heat available from the coated object.

2 Claims, No Drawings

POLYETHYLENE COATING FOR FERROUS METALS

This application is a division of application Ser. No. 464,658, filed Apr. 26, 1974, now abandoned.

BACKGROUND OF THE INVENTION

The present invention is in the field of thermoplastic coatings, more specifically polyethylene coatings for ferrous metals.

Plastics in the form of powder have been used for coating metal substrates to protect them from corrosion. Various methods of application and curing are known such as preheating an object to a temperature ranging from 350° to 600° F and dipping the object in a fluidized bed, spraying it by flock or electrostatic gun. No one type of polyethylene by itself has proven to be a satisfactory coating material due to poor adhesion to the metal substrate of low density types or the high cost and poor physical characteristics of the high density types. To obtain an acceptable adhesion level, primers were developed consisting of either special high density polyethylene or ethylene copolymers. These primers may be applied to the metal substrate in relatively thin films (2-4 mils), fused and subsequently covered with a finish coat of low density polyethylene to develop the total thickness required. This two-step application procedure requires close temperature control of both application steps with concomitant high capital cost for production equipment.

The use of primers as a full thickness coating has not proven satisfactory for several reasons. Pigmentation to provide resistance to ultra violet rays may adversely change adhesive characteristics. Cured physical properties are unsatisfactory in that the surface may be quite soft and rubbery or hard and brittle. Also, the high density primer is much more expensive than low density polyethylene.

SUMMARY OF THE INVENTION

The present invention comprises a blend of relatively expensive high density polyethylene powder and relatively inexpensive low density polyethylene powder cured as a surfacing for ferrous metal surfaces. The two materials may be mixed using conventional dry material mixing equipment and techniques. Application may be by spray or dip methods where the metal surface to be coated is at 350° to 600° F. After application, the coating should be kept in an atmosphere of from 400° to 500° F for a period of from 10 minutes to 15 minutes. Satisfactory coatings are obtained from blends of high and low density polyethylene powders between and including the ratios of from 1:1 to 1:3, such ratios being by volume of high density to low density polyethylene.

An object of this invention is to provide a coating for ferrous metal objects that adheres tenaciously to the object even when subjected to weathering in the extremes of both hot and cold climates.

Another object is to furnish a material that may be applied in one coat covering the entire surface with a sufficient thickness to protect the surface from corrosion.

Yet another object is to furnish a material that may be applied by known methods and with known equipment.

DESCRIPTION OF THE PREFERRED EMBODIMENT

Due to the problems encountered with the prior art methods, it was conceived that the desired objectives of tenacious adhesion, single-stage application and minimal cost might be obtained by blending plastic powders. A number of combinations were tried with minor success. However, a blend of linear high density polyethylene and low density polyethylene produced results that were quite unexpected. The two ingredients were blended in ratios of from 1:1 to 1:3, high density polyethylene to low density polyethylene and applied to a cleaned and heated (400° to 500° F) ferrous metal surface. The metal surfaces coated were small sections cut from a centrifugally cast pipe of gray iron which had been annealed. The customary oxide which forms on the surface during annealing had been entirely removed, to "white" metal by grit blasting, or eighty per cent of the oxide had been removed by grinding with an abrasive wheel, prior to coating.

Adhesion of the coating was measured by making two razor blade cuts through the coating ¼ inch apart and attempting to peel the ¼ inch strip of coating from the metal surface. If the coating could be lifted and peeled from the metal surface in one piece, the adhesion was said to be "poor." If the coating could be lifted and peeled from the surface but broke into small pieces approximately ⅛ inch long, the adhesion was said to be "good." If the coating could not be lifted to peel off small pieces, the adhesion was said to be be "excellent."

Results of these tests are tabulated below:

| Blend Ratio High Density to Low Density | Metal Surface Temp. Degrees F. | Surface Preparation | Adhesion |
| --- | --- | --- | --- |
| 1:1 | 400 | Grit Blast | Poor |
| 1:1 | 450 | Grit Blast | Good |
| 1:1 | 500 | Grit Blast | Good |
| 1:1 | 400 | 80 % Grind | Poor |
| 1:1 | 450 | 80 % Grind | Good |
| 1:1 | 500 | 80 % Grind | Good |
| 1:2 | 400 | Grit Blast | Poor |
| 1:2 | 450 | Grit Blast | Good |
| 1:2 | 500 | Grit Blast | Excellent |
| 1:2 | 400 | 80 % Grind | Poor |
| 1:2 | 450 | 80 % Grind | Good |
| 1:2 | 500 | 80 % Grind | Excellent |
| 1:3 | 400 | Grit Blast | Poor |
| 1:3 | 450 | Grit Blast | Good |
| 1:3 | 500 | Grit Blast | Excellent |
| 1:3 | 400 | 80 % Grind | Poor |
| 1:3 | 450 | 80 % Grind | Good |

-continued

| Blend Ratio High Density to Low Density | Metal Surface Temp. Degrees F. | Surface Preparation | Adhesion |
|---|---|---|---|
| 1:3 | 500 | 80 % Grind | Excellent |

The resulting coatings were compared with those applied by prior art methods and found to adhere more tenaciously.

The prior art coatings used for comparative tests were prepared in the following manner. The object to be coated was grit-blast cleaned to white metal and heated to temperatures of 550° to 600° F. A primer of high density linear polyethylene, density of 0.95, was applied to a thickness of approximately 4 mils by means of air spray. This was allowed to fuse and a final coat of low density polyethylene, density 0.916, was immediately applied to a thickness of 15–20 mils. The resultant coating was cured by the residual heat in the object being coated. In other cases, the same temperature level and procedure was used except that the primer was ethylene vinyl acetate copolymer, density 0.94, applied to a thickness of approximately 4 mils.

One test used to compare adhesion was to place the coated ferrous metal surface in boiling water. In such a test a coating applied by the above described prior art method failed in four and one-half hours while a coating applied according to the present invention had not failed after 41.5 hours in boiling water.

Applicant's blend consisted of high density linear polyethylene powders with the following range of properties: 0.945 to 0.960 density, to 6 to 18 melt index and 35 to 50 mesh particle size, such as U.S. Industrial Chemicals Company's ML-713, U.S. Industrial Chemicals Company's MA-778 and Phillips Petroleum Company BMN TR-980, and low density polyethylene powders with the following range of properties: 0.91 to 0.92 density, 16 to 25 melt index and 35 to 50 mesh particle size, such as U.S. Industrial Chemicals Company's MC-91007, U.S. Industrial Chemicals Company's 711-942, or Union Carbide Corporation's DNPA 0408.

Blending may be accomplished by using a V-shaped rotating drum type blender or other satisfactory dry powder blender. Such blenders are well known to those familiar with the art and include Patterson-Kelly Company's rotating drum blenders, as well as paddle or ribbon blenders.

Application was accomplished by entraining the desired amount of blended powder in an air stream and directing the air stream and the entrained powder onto the hot (400° to 500° F) ferrous metal surface. The blend of powders fused together into a uniform coating covering the metal surface completely. Coatings of various thicknesses were applied to ferrous metal surfaces. The thickness was varied by simply applying more powder to the surface. Complete coverage of the ferrous metal surface with a coating of 15 mils thickness was found to be easily attainable. Thinner coatings tended to leave small uncoated areas. Thicker coatings up to 45 mils were also applied in the same manner with excellent results. Also coatings of the same blended powder were applied to ferrous metal surfaces by the well-known fluidized bed method. In these trials the ferrous metal surface to be coated was heated to between 400° and 600° F and brought into contact with a fluidized bed of the blended powder. Coatings obtained from such a method were of the same appearance and quality as those obtained from entraining the blended powder in an air stream and directing the resulting stream onto the metal surface.

A series of tests was made using blends of a high density polyethylene obtained from U.S. Industrial Chemicals Company, MA 778, with melt index -6, density -0.949, 35 mesh powder and a low density polyethylene also obtained from U.S. Industrial Chemicals Company, MC-91007, with melt index -22, density -0.916, 35 mesh powder. Grit blast cleaned ductile iron panels were heated to various temperature levels and coated in a fluidized bed. Each panel was tested for adhesion after four hours in boiling water with the following results:

| Panel Temp. ° F | Blend 1 Part - MA-778 3 Parts - MC-91007 | Blend 1 Part - MA-778 2 Parts - MC-91007 |
|---|---|---|
| 400 | — | Poor |
| 450 | Excellent | Excellent |
| 500 | Excellent | Excellent |
| 525 | Excellent | Excellent |
| 550 | Good | Excellent |
| 575 | Fair | Good |
| 600 | Fair | Good |

A series of tests were made with blend ratios ranging from 1:1 to 1:3 linear high density polyethylene to low density polyethylene and evaluated for film characteristics. The materials used were U.S. Industrial Chemicals Company's ML-713 and Union Carbide Corporation's DNPA 0408. The results were as follows:

| Blend Ratio High:Low | Panel Temp. ° F | 4-Hour Boiling Water Adhesion |
|---|---|---|
| 1:1 | 400 | Poor |
| 1:1 | 450 | Good |
| 1:1 | 500 | Good |
| 1:2 | 400 | Poor |
| 1:2 | 450 | Good |
| 1:2 | 500 | Excellent |
| 1:3 | 400 | Poor |
| 1:3 | 450 | Good |
| 1:3 | 500 | Excellent |

When the blend of high density to low density polyethylene was increased above 1:1, e.g. 1.25:1, the resultant coating was brittle and took on a dull, wrinkled finish rather than a smooth finish. Reducing the proportion of high density linear polyethylene below 1:3 was found to result in a loss in adhesion.

While the above description is of the preferred embodiment of the present invention, it will be understood that modifications will be apparent that will fall within the scope of the invention.

We claim:

1. A method of coating a metal article with a polyethylene composition comprising the steps of preparing a blend of high density and low density polyethylene powders, said blend containing a range by volume of from 1 part of high density polyethylene and 1 part of low density polyethylene to 1 part of high density polyethylene to 3 parts of low density polyethylene, heating a surface of said metal article to a temperature of between above 450° to about 600° F. applying said blend of powders over said heated surface of said metal article to a desired thickness, maintaining said surface at a temperature of between over 450° to about 600° F. for a period of from about 5 to 15 minutes, and the cooling said metal article to ambient temperature.

2. A method of coating a metal article with a polyethylene compound as recited in claim 1 in which said blend of powders is applied in a thickness of between 15 and 45 mils.

* * * * *